(12) United States Patent
Suzuki et al.

(10) Patent No.: US 8,833,850 B2
(45) Date of Patent: Sep. 16, 2014

(54) VEHICLE SEAT

(71) Applicant: Toyota Boshoku Kabushiki Kaisha, Aichi-ken (JP)

(72) Inventors: Yuya Suzuki, Toyota (JP); Shinya Ando, Miyoshi (JP); Takushi Matsumoto, Toyota (JP); Kosuke Araki, Toyota (JP); Masato Kunisada, Nagoya (JP); Keiichiro Inoue, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 63 days.

(21) Appl. No.: 13/676,492

(22) Filed: Nov. 14, 2012

(65) Prior Publication Data
US 2013/0119721 A1 May 16, 2013

(30) Foreign Application Priority Data
Nov. 15, 2011 (JP) ................. 2011-249554

(51) Int. Cl.
*B60N 2/427* (2006.01)
*B60N 2/42* (2006.01)

(52) U.S. Cl.
CPC .......... *B60N 2/4235* (2013.01); *B60N 2/42709* (2013.01)
USPC .................................................. 297/216.1

(58) Field of Classification Search
USPC ................................ 297/216.1, 452.2, 452.18
See application file for complete search history.

(56) References Cited

U.S. PATENT DOCUMENTS

| 3,544,164 A * | 12/1970 | Ohta | 297/452.2 |
| 6,523,893 B2 * | 2/2003 | Kamper et al. | 297/216.13 |
| 7,699,397 B2 * | 4/2010 | Andou et al. | 297/354.12 |

FOREIGN PATENT DOCUMENTS

JP    2010-52455    3/2010

* cited by examiner

*Primary Examiner* — Milton Nelson, Jr.
(74) *Attorney, Agent, or Firm* — Greenblum & Bernstein, P.L.C.

(57) ABSTRACT

A vehicle seat including a rod installed between left and right side frames of a seat cushion, wherein the rod is provided with a weakened part which is configured to promote the buckling distortion of the rod in a predetermined direction, wherein the weakened part includes first and second weakened portions which respectively weakens a portion of a surface of the rod facing a first direction and a portion of a surface of the rod facing a second direction opposite to the first direction at an end portion of a side of the rod to which an impact load is inputted, so that the rod is configured to be bent in the first direction and the second direction, and wherein the first weakened portion is formed closer to the side to which the impact load is inputted than the second weakened portion.

5 Claims, 8 Drawing Sheets

VEHICLE SEAT

CROSS-REFERENCE TO RELATED APPLICATIONS

This application claims priority from Japanese Patent Application No. 2011-249554 filed on Nov. 15, 2011, the entire contents of which are incorporated herein by reference.

TECHNICAL FIELD

The present invention relates to a vehicle seat. More specifically, the present invention relates to a vehicle seat including a rod installed between both left and right side frames of a seat cushion.

BACKGROUND

In a related-art vehicle seat, a configuration is known in which a rod for synchronously performing an unlocking operation of slide devices at left and right sides is installed between left and right side frames of a seat cushion (see JP-A-2010-052455). This rod is formed by a straight hollow round bar. Operating arms for performing an unlocking operation of each slide device are integrally coupled to both ends of the rod. In this way, the rod is pivotally supported and is rotatable relative to each frame of the seat cushion.

SUMMARY

However, in the related-art vehicle seat disclosed in JP-A-2010-052455, when a side collision of a vehicle occurs and thus an impact load is inputted to a seat cushion from a side of the vehicle, the rod may be subjected to a buckling distortion toward a lower side of the seat cushion. This is not desirable in a case where a portion of a battery unit such as a service plug is arranged below the seat cushion. The present invention has been made to solve the above-described problem and an object of the present invention is to provide a vehicle seat capable of allowing the rod installed between the left and right side frames of a seat cushion to be properly subjected to flexion deformity in a direction aimed at the time of a side collision of a vehicle.

According to an aspect of the present invention, there is provided a vehicle seat including a rod installed between left and right side frames of a seat cushion, wherein the rod is provided with a weakened part which is configured to promote the buckling distortion of the rod in a predetermined direction so that the rod is subjected to flexion deformity in a first direction which is a direction away from a battery unit installed to a lower part of the seat cushion when a side collision occurs and thus an impact load is inputted to the seat cushion from a side of the vehicle seat, wherein the weakened part includes a first weakened portion and a second weakened portion which respectively weakens a portion of a surface of the rod facing the first direction and a portion of a surface of the rod facing a second direction opposite to the first direction at an end portion of a side of the rod to which the impact load is inputted, so that the rod is configured to be bent in the first direction and the second direction, and wherein the first weakened portion is formed closer to the side to which the impact load is inputted than the second weakened portion.

According to another aspect of the present invention, there is provided a vehicle seat comprising: left and right side frames of a seat cushion; and a rod installed between the left and right side frames, the rod including a weakened part which is configured to promote the buckling distortion of the rod in a predetermined direction so that the rod is subjected to flexion deformity in a first direction when an impact load is inputted to the seat cushion from a side of the vehicle seat, the weakened part including a first weakened portion and a second weakened portion which respectively weakens a portion of a surface of the rod facing the first direction and a portion of a surface of the rod facing a second direction opposite to the first direction at an end portion of a side of the rod to which the impact load is inputted so that the rod is configured to be bent in the first direction and the second direction, the first weakened portion being formed closer to the side to which the impact load is inputted than the second weakened portion.

Accordingly, when the impact load is inputted to the rod from a side of the seat, the rod is subjected to the flexion deformity in such a way that a buckling distortion occurs in a first direction which is a direction away from the battery unit from the first weakened portion close to the inputted side and also a buckling distortion occurs in a second direction opposite to the first direction from the second weakened portion closer to the central side than the first weakened portion. Thereby, the rod is deformed to be pushed and shrunk in a width direction of the seat in such a way that the shape of the rod is entirely flexed in the direction away from the battery unit. In this way, it is possible to allow the rod to be properly subjected to the flexion deformity in the aimed direction away from the battery unit.

DETAILED DESCRIPTION

Hereinafter, an illustrative embodiment for carrying out the present invention will be described with reference to the accompanying drawings.

<First Exemplary Embodiment>

Figure 1:
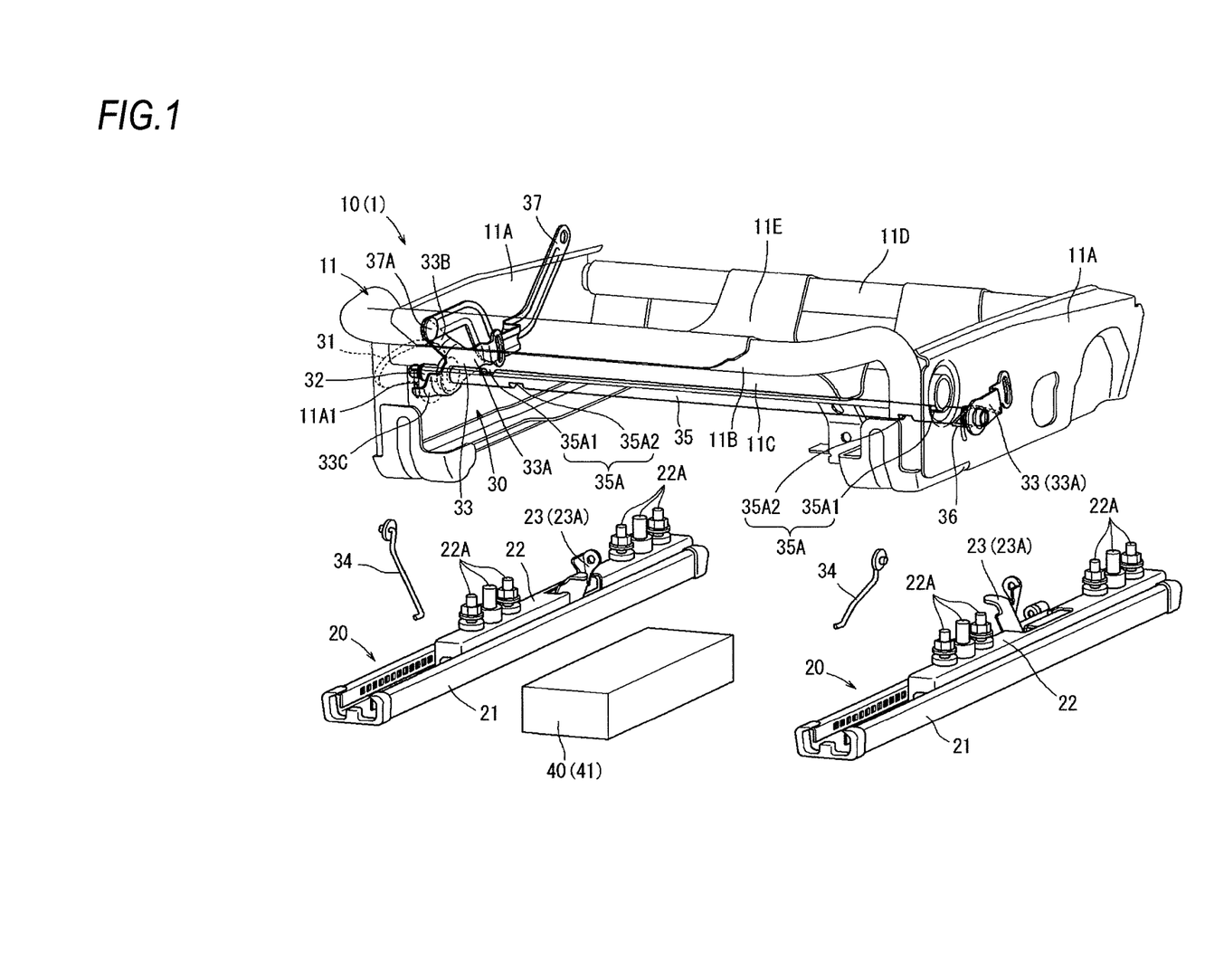
FIG. 1 is an exploded perspective view of main parts showing a schematic configuration of a vehicle seat according to a first exemplary embodiment.

First, a configuration of a vehicle seat 1 according to a first exemplary embodiment will be described with reference to FIGS. 1 to 8. As shown in FIG. 1, the vehicle seat 1 of the present embodiment is configured as a driver's seat of a vehicle and includes a seat back (not shown) serving as a backrest and a seat cushion 10 serving as a seating part for a seated occupant. A pair of left and right slide devices 20 is provided between a lower surface of the sheet cushion 10 and a floor and a slide position of the seat cushion 10 relative to the floor in a front-rear direction can be adjusted by the slide devices 20.

Each of the slide devices 20 is normally in a state where a slide movement of the seat cushion 10 is locked and thus the slide position of the seat cushion 10 is fixed. The slide lock state of these slide devices 20 is released by a releasing mechanism 30 which is operated by a pulling-up operation of a release lever 31. The release lever 31 is provided at a side of the seat cushion 10 at the outer side of the vehicle. Here, as shown in FIGS. 2 to 5, the releasing mechanism 30 is configured so that the rod 35 installed between both side frames 11A of the seat cushion 10 is integrally coupled to the releases lever 31 and each of release members 33 for releasing a lock mechanism 23 of each slide device 20 is integrally coupled to both ends of the rod 35 between the side frames 11A.

The rod 35 is formed by a straight hollow round bar and installed in a state where both ends thereof are respectively pivotally supported to rotate relative to each side frame 11A of the seat cushion 10. Specifically, an end of the rod 35 at the outer side (left side of FIG. 1) of the vehicle is pivotally supported and is rotatable relative to the side frame 11A on the same side in such a way that a support shaft 32 fitted and integrally welded to the end is inserted through the side frame 11A on the same side from an inner side of the seat and is pivotally supported by the side frame 11A on the same side. Further, an end of the rod 35 at the inner side (right side of FIG. 1) of the vehicle is inserted through the side frame 11A on the same side and thus the rod 35 itself is pivotally supported to be rotatable relative to the side frame 11A on the same side.

Figure 6:
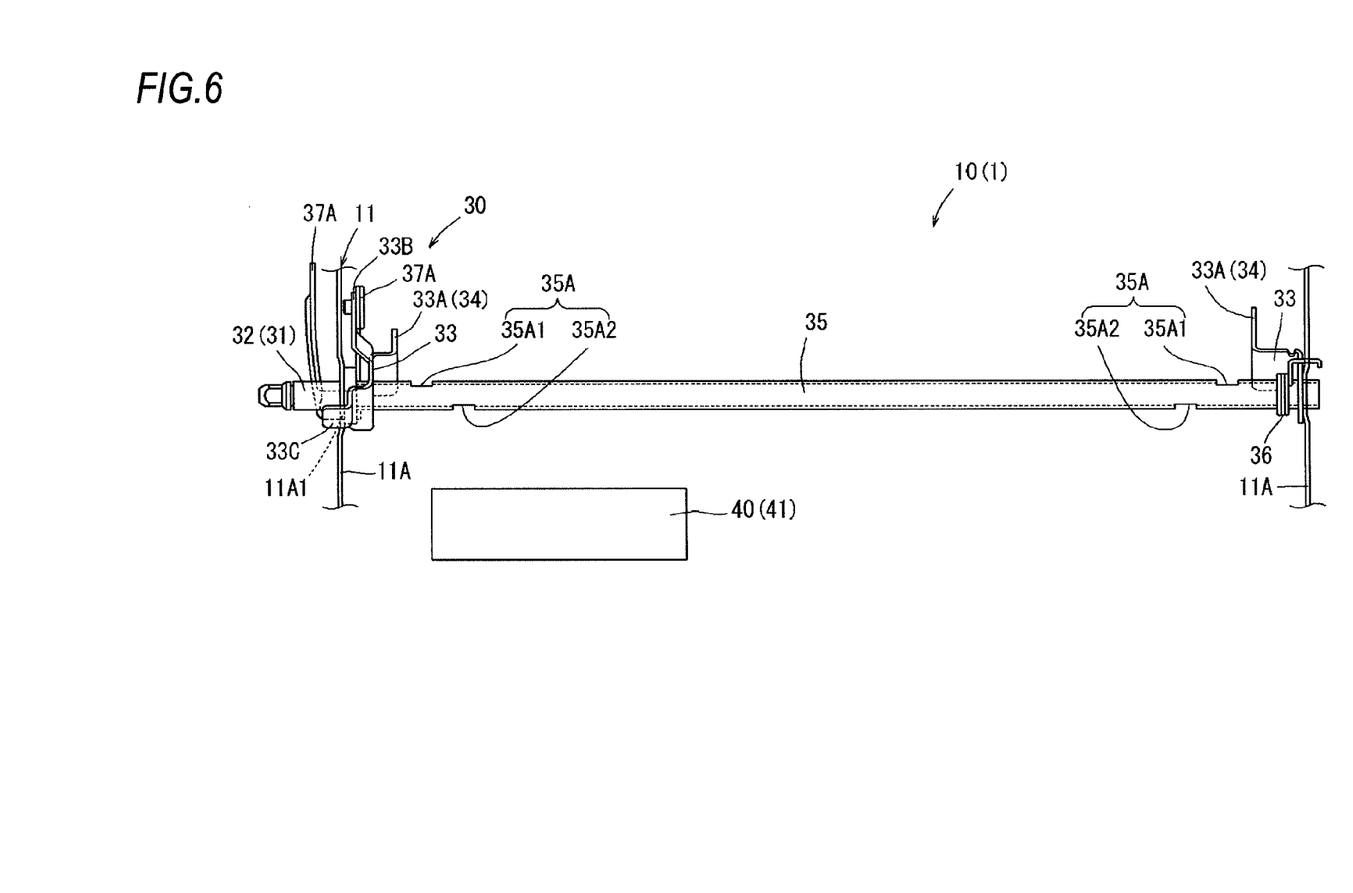
FIG. 6 is a front view showing an arrangement of the rod.
Figure 7:
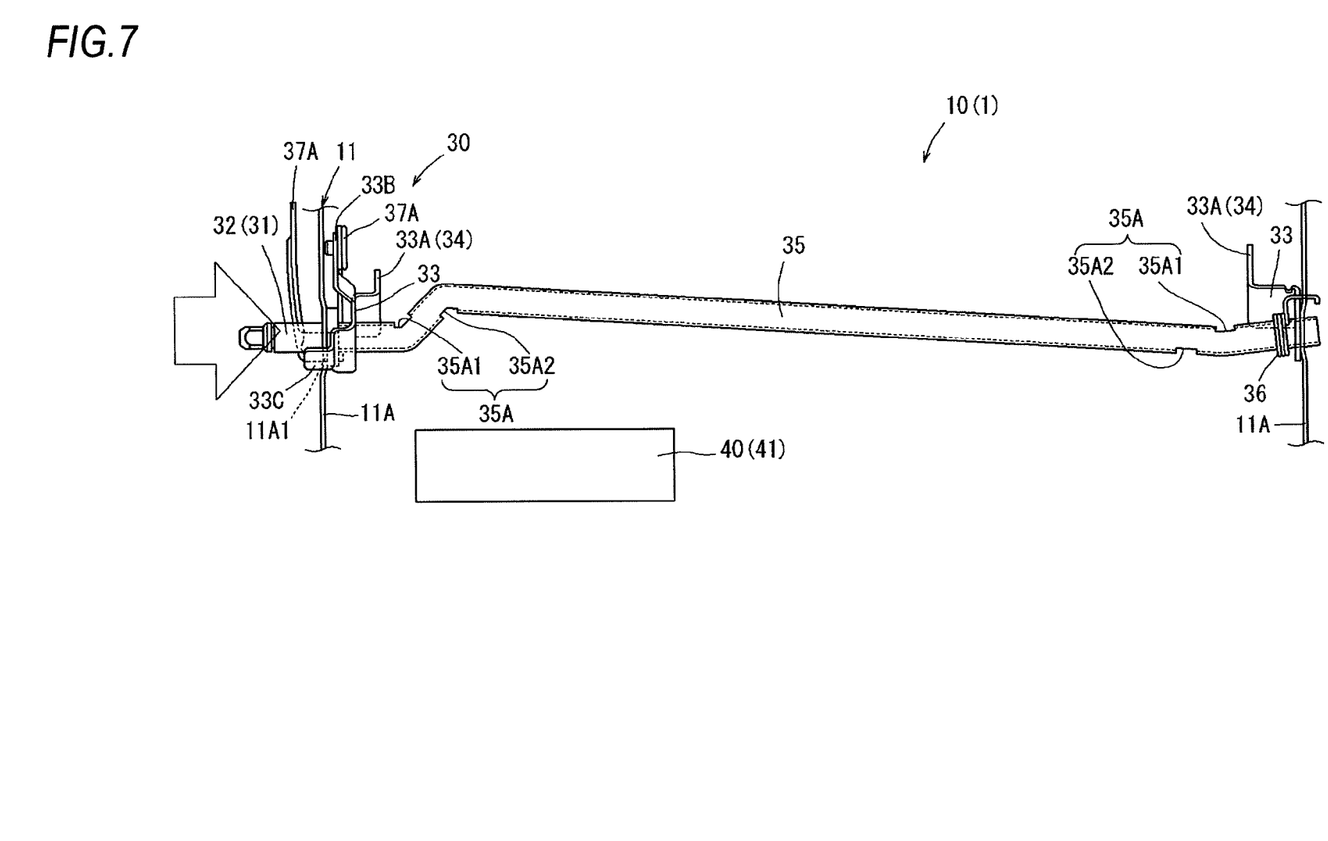
FIG. 7 is a front view showing a state where the rod is subjected to a flexion deformity by occurrence of a side collision.
Figure 8:
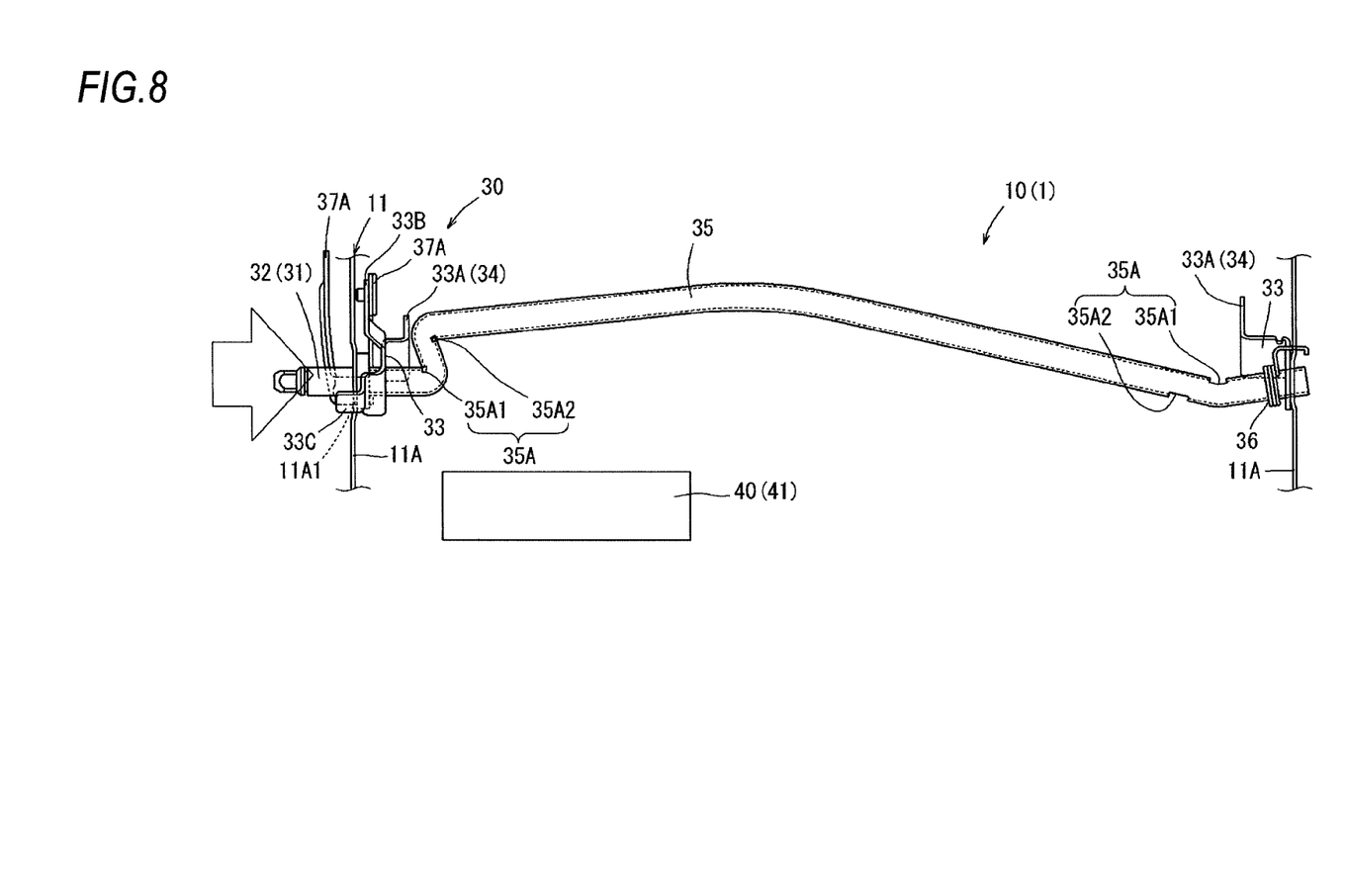
FIG. 8 is a front view showing a state where the flexion deformity of the rod has further processed from the state of FIG. 7.

As shown in FIG. 6, the rod 35 is normally maintained in a state in which the rod straightly extends in the width direction of the seat between both side frames 11A of the seat cushion 10. However, as shown in FIGS. 7 and 8, the rod 35 is subjected to the buckling distortion in such a way that the shape thereof is bent when a side collision of the vehicle occurs and thus an impact load is inputted to the seat cushion 10 from a side of the vehicle. At this time, if the buckling distortion of the rod 35 is carried out in such a way that the rod is bent toward a lower portion of the seat cushion 10, there is a risk that the rod 35 is brought into contact with a service plug 41 of the battery unit 40 provided below the seat cushion 10 and therefore such an aspect is undesirable. Accordingly, in the present exemplary embodiment, the rod 35 is provided with weakened parts 35A (first cut-out 35A1 and second cut-out 35A2). When the impact load is inputted from the side of the seat as mentioned above, the weakened parts 35A are configured to promote the buckling distortion of the rod 35 in a predetermined direction so that the rod 35 is subjected to the flexion deformity in the direction away from the service plug 41 (the battery unit 40). Here, the first cut-out 35A1 corresponds to a "first weakened portion" of the present invention and the second cut-out 35A2 corresponds to a "second weakened portion" of the present invention.

Hereinafter, each configuration of the seat cushion 10, the slide devices 20 and the releasing mechanism 30 is described in detail. First, the configuration of the seat cushion 10 is described by referring to FIG. 1. The seat cushion 10 includes a seat cushion frame 11 forming an internal framework of the seat cushion, a cushion pad (not shown) set to cover the top of the seat cushion frame 11 and a skin material (not shown). The skin material covers and is fixed to the seat cushion 10 from an upper surface thereof to a lower surface via each of front-rear side surfaces and left-right side surfaces so as to cover the entire surface of the cushion pad.

The seat cushion frame 11 includes a pair of left and right standing plate-shaped side frames 11A, a front frame 11B coupled to front ends of the left and right side frames 11A in a state of being lain astride therebetween and reinforcing pipes 11C, 11D coupled to both side frames 11A in a state of being respectively lain astride between front portions and between rear portions of both side frames 11A and thus has a square frame shape, as seen from a plan view. A thin iron-plate shaped cushion pan 11E is coupled in a state of being lain astride between the front frame 11B of the seat cushion frame 11 and the rear-side reinforcing pipe 11D. The cushion pan 11E serves as a function of a surface site supporting the cushion pad (not shown) set on an upper surface of the cushion pan 11E from the lower side.

Next, the configuration of the slide devices 20 is described. A pair of left and right slide devices 20 is arranged between the seat cushion 10 and the floor and respectively includes a lower rail 21 integrally fixed on the floor, an upper rail 22 assembled and mounted capable of sliding in a front-rear direction relative to each lower rail 21 and a lock mechanism 23 provided to each upper rail 22. The lock mechanism 23 is engaged with each lower rail 21 to lock the slide movement of each upper rail 22. A plurality of coupling pins 22A is installed on an upper surface of each upper rail 22. Accordingly, a bottom of each side frame 11A of the seat cushion frame 11 is seated on the upper surface of each upper rail 22 and then coupled thereto by each coupling pin 22A, so that each side frame 11A is integrally coupled.

Each of the slide devices 20 is normally held in a state where each lock mechanism 23 of the slide devices locks the slide movement of each upper rail 22 by a biasing structure of a spring (not shown). The slide lock state of these slide devices 20 is released by a release arm 23A of each lock mechanism 23 being pushed down by an operation of a release lever 31 (which will be described later). When an operating state of the release lever 31 is released, the pushed down state of the each release arm 23A is released. And thus, each lock mechanism 23 is again actuated to lock the slide movement of the upper rail by the biasing structure of the spring, so that each slide device 20 returns to the slide locked state. Since the basic configuration of each slide device 20 is the same as the configuration disclosed in a literature such as JP-A-2010-221935, a detailed description thereof is omitted.

Figure 2:
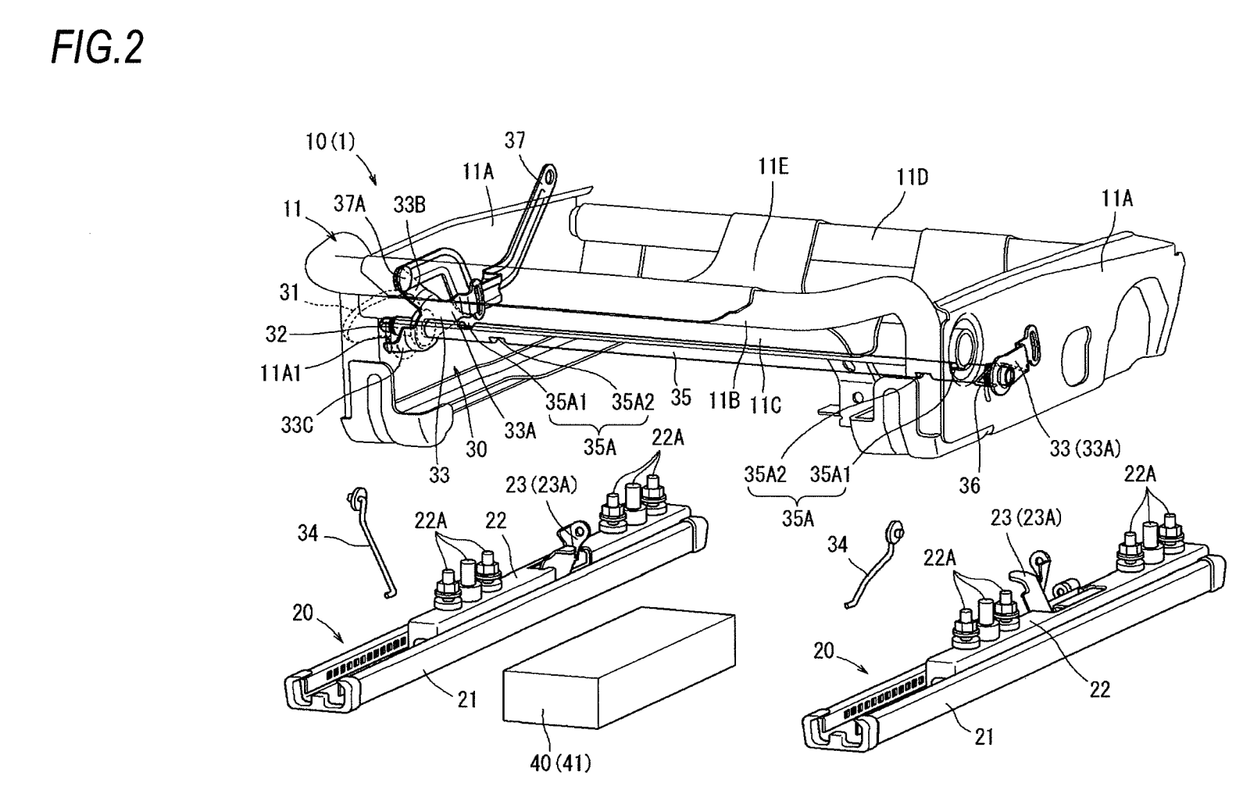
FIG. 2 is an exploded perspective view showing a configuration of a rod and a release arm.
Figure 3:
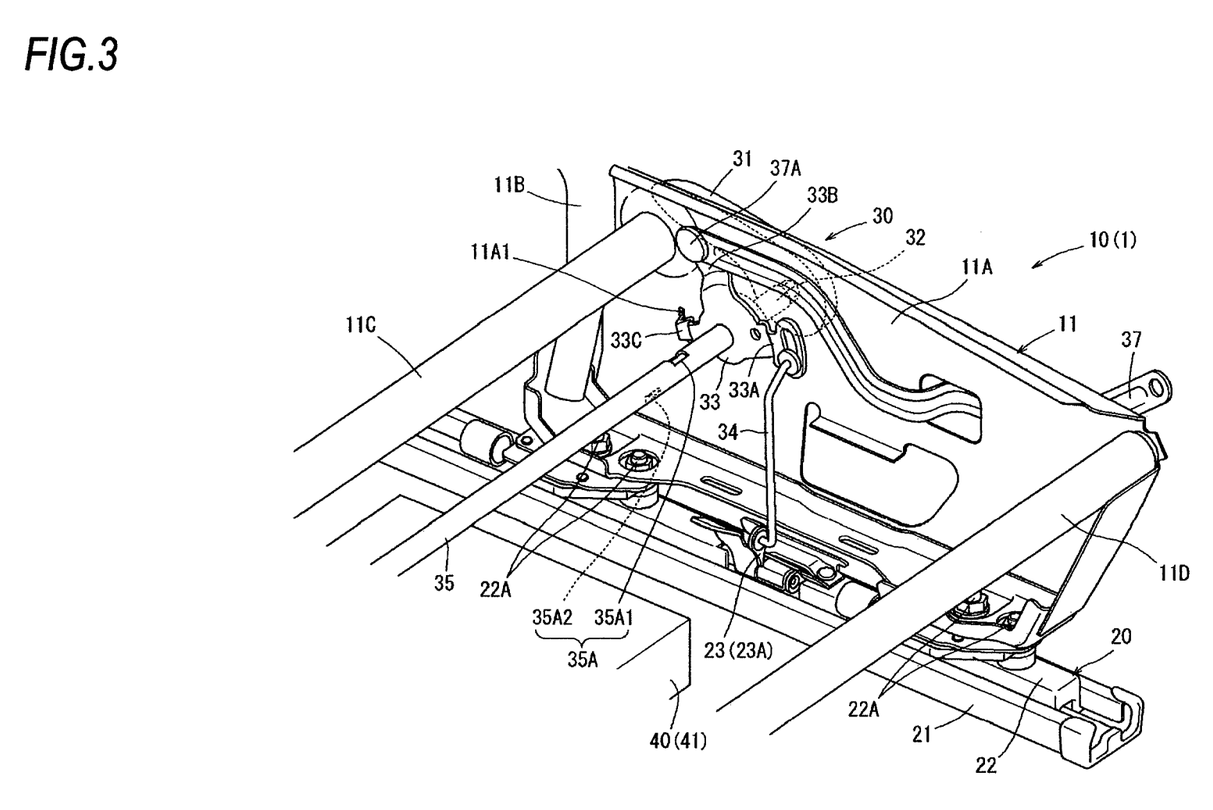
FIG. 3 is a perspective view showing a side frame structure of a seat cushion at an outer side of the vehicle.
Figure 4:
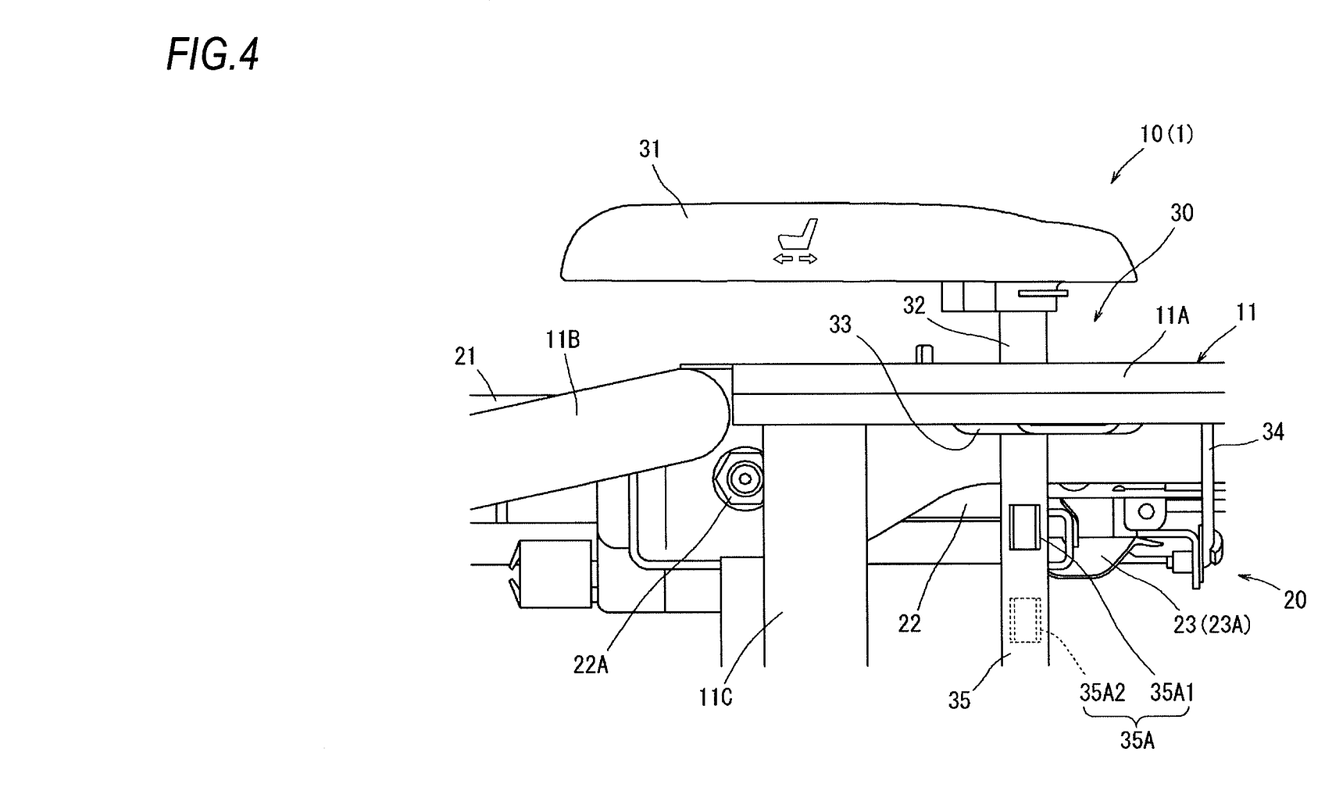
FIG. 4 is an enlarged plan view showing an arrangement of a release lever.
Figure 5:
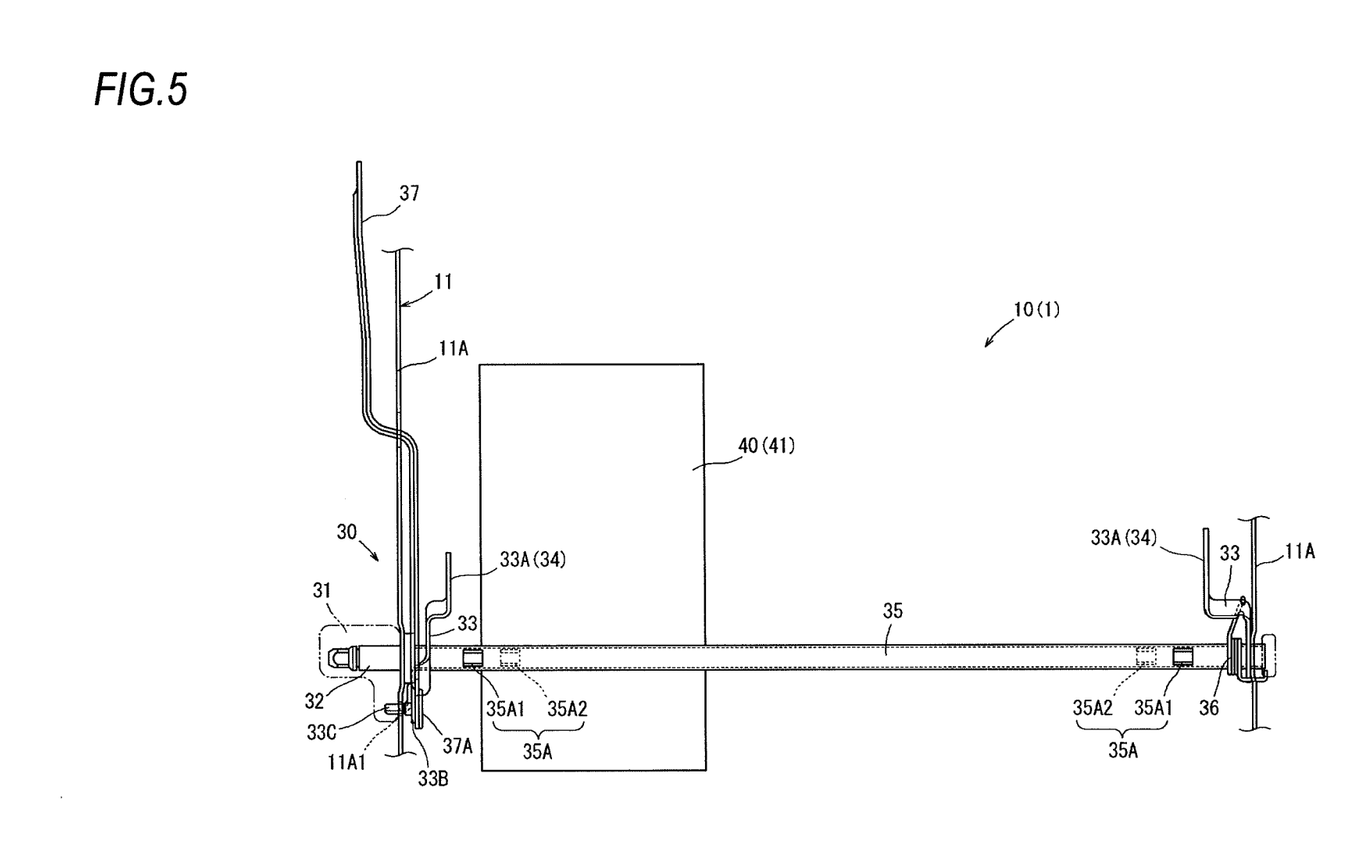
FIG. 5 is a plan view showing an arrangement of the rod.

Next, the configuration of the releasing mechanism 30 is described. The releasing mechanism 30 includes the release lever 31, the support shaft 32, two release members 33, two control bars 34 respectively connected to the release members 33, the rod 35, a torsion spring 36 and a rear operation lever 37, as shown in FIGS. 2 to 5. As shown in FIG. 4, the release lever 31 is arranged at a side of the seat cushion 10 at the outside of the vehicle. The release lever 31 is installed in a state where the release lever 31 is integrally coupled to the support shaft 32 which is inserted through and mounted on the side frame 11A on the same side and thus can be pulled up by rotation about the support shaft 32. As shown in FIGS. 1 and 2, the support shaft 32 is fitted and integrally coupled to an end of the rod 35 at the outside of the vehicle. The support shaft is in a state of being inserted through the side frame 11A of the seat cushion 10 at the outer side of the vehicle from an inner side of the vehicle and thus pivotally supported. As mentioned above, since the support shaft 32 is inserted through and mounted to the side frame 11A at the outer side of the vehicle from the inner side of the vehicle, a head portion of the support shaft 32 is in a state of being locked with the side frame, and thus, the support shaft 32 is prevented from falling off from the side frame 11A to the outer side of the sheet The two release members 33 are respectively inserted through each end of the rod 35 in an axial direction and integrally coupled to each end of the rod 35 by welding. Among these two release members 33, the release member 33 coupled to an end of the rod 35 at the outer side of the vehicle has a shape in which an operation arm 33A, a connection arm 33B and a stopper arm extend in three radial directions. An upper end of the control bar 34 is coupled to the operation arm 33A, a front end of the rear operation lever 37 is coupled to the connection arm 33B by a pin 37A and a leading end of the stopper arm 33C is in a state of being inserted through an arc-shaped long hole 11A1 which is formed on the side frame 11A of the seat cushion 10. A lower end of the control bar 34 is coupled to the release arm 23A of the lock mechanism 23 of the slide device 20. The long hole 11A1 has a shape curved in an arc shape which is drawn around the support shaft 32 serving as a rotational center of the release member 33. The rear operation lever 37 coupled to the connection arm 33B extends from a connection portion with the connection arm 33 toward a rear side of the seat and on the way, escapes the side frame 11A of the seat cushion 10 at the outer side of the vehicle from the inside to the outside of the seat, and a rear end of the rear operation lever 37 extends out toward a rear portion of the seat at the side of seat cushion 10 at the outer side of the vehicle.

The release member 33 thus configured is in a state capable of pivoting within a range which the stopper arm 33C is movable in the long hole 11A1 of the side frame 11A. As the release lever 31 is pulled-up by a rotational operation, the operation arm 33A pushes down the control bar 34, so that the slide lock state of the slide device 20 on the same side can be released. Further, the rear operation lever 37 is configured so that an occupant seated on a seat at the rear side of the vehicle seat 1 (driver's seat) can pull the rear operation lever 37 rearward to rotationally operate the release member 33, like a case of an operation pulling up the release lever 31.

Meanwhile, the release member 33 coupled to an end of the rod 35 at the inside of the vehicle has a shape in which the operation arm 33A extends out in one radial direction. An upper end of the control bar 34 is coupled to the operation arm 33A and a lower end of the control bar 34 is coupled to the release arm 23A of the lock mechanism 23 of the slide device 20. The release member 33 is integrally coupled to the release lever 3 and the rear operation lever 37 at the inside of the vehicle via the rod 35. As the release lever 31 is pulled-up (or the rear operation lever 37 is pulled rearward), the operation arm 33A pushes down the control bar 34, so that the slide lock state of the slide device 20 on the same side (inside of the vehicle) can be released.

The torsion spring 36 is hooked between the release member 33 at the inside of the vehicle and the side frame 11A of the seat cushion 10 on the same side. The torsion spring 36 is wound around the rod 35. One end of the torsion spring 36 is hooked on the release member 33 and the other end thereof is hooked on the side frame 11A. Since the torsion spring 36 is installed, the release lever 31 (and the rear operation lever 37) is in a state of being subjected to a biasing load in a direction to return the release lever 31 to an initial position before the pulling operation. The rotational movement in the return direction by the biasing load of the torsion spring 36 is locked at a position (the initial position) in which a leading end of the stopper arm 33C of the release member 33 at the outer side of the vehicle is brought into contact with a lower end of the long hole 11A1 of the side frame 11A on the same side.

As mentioned above, an end of the rod 35 at the outer side of the vehicle is pivotally supported so as to be rotatable relative to the side frame 11A of the seat cushion 10 on the same side via the support shaft 32 and an end of the rod 35 at the inner side of the vehicle is inserted through and pivotally supported to the side frame 11A on the same side. The release members 33 are respectively welded and integrally coupled to both ends of the rod 35 between both side frames 11A of the seat cushion 10 and thus an axial movement of the rod relative to both side frames 11A is restricted.

Accordingly, when the side collision of the vehicle occurs and thus the impact load is inputted to the rod 35 from the side of the seat, the rod 35 is deformed in a manner including a buckling due to the elongated shape in the width direction of the seat. However, the buckling distortion of the rod 35 is made such that the flexion deformity of the rod 35 proceeds in a direction away from the service plug 41 (the battery unit 40) installed below the seat cushion 10 by the weakened parts 35A formed to the end portions of each side of the rod 35, as shown in FIGS. 7 and 8.

Specifically, as shown in FIG. 6, the weakened parts 35A includes the first cut-out 35A1 and the second cut-out 35A2 which are made by cutting out a portion of a peripheral surface of the rod 35. The first cut-out 35A1 and the second cut-out 35A2 are formed on each end portion of the rod 35 close to the connection with each side frame 11A. The first cut-out 35A1 is formed by cutting out a portion of an upper surface of the rod 35, that is, a surface of the rod 35 away from the service plug 41 (the battery unit 40). The second cut-out 35A2 is formed by cutting out a portion of a lower surface of the rod 35, that is, a surface of the rod 35 close to the service plug 41 (the battery unit 40). The first cut-out 35A1 and the second cut-out 35A2 are bilaterally symmetrically formed relative to the rod 35 and each second cut-out 35A2 is formed at a location closer to the central side of the rod 35 than each first cut-out 35A1. Further, each cut-out shape of the first cut-out 35A1 and the second cut-out 35A2 has a wide cut-out width in the axial direction within a degree such that the cut-out surfaces are not brought into contact with each other unless the rod 35 is bent over 90° at each cut-out as a starting point.

As shown in FIGS. 7 and 8, when the side collision of the vehicle occurs and thus the impact load is inputted to the rod 35 through the side frame 11A of the seat cushion 10 at the outer side of the vehicle from a side of the seat, the rod 35 thus configured is subjected to the flexion deformity in such a way that a buckling distortion occurs in a direction (upper direction) away from the service plug 41 (the battery unit 40) from the first cut-out 35A1 close to the inputted end portion and also a buckling distortion occurs in an opposite direction (lower direction) of the above direction from the second cut-out 35A2 closer to the central portion than the first cut-out. Further, as the impact load is inputted, the rod 35 is subjected to the flexion deformity in such a way that a buckling distortion occurs in the direction (upper direction) away from the service plug 41 (the battery unit 40) from the first cut-out 35A1 and also a buckling distortion occurs in an opposite direction (lower direction) of the above direction from the second cut-out 35A2 closer to the central side than the first cut-out, even at a portion close to the side frame 11A of the seat cushion 10 at the inner side of the vehicle. Although each flexion deformity of the rod 35 is similarly realized in an opposite side of the side to which the impact load is inputted, the size of the amount of the flexion deformity is particularly significant on the side to which the impact load is inputted.

In this manner, the rod 35 is subjected to the buckling distortion in such a way that the rod is deformed to be pushed and shrunk in the width direction of the seat and the shape of the rod is entirely flexed in the direction away from the service plug 41 (the battery unit 40). Therefore, it is possible to allow the rod 35 to be properly subjected to the flexion deformity in the direction away from the service plug 41 (the battery unit 40) when the side collision of the vehicle occurs. Specifically, the first cut-out 35A1 and the second cut-out 35A2 are formed at the locations of the rod 35 which are spaced from each other in the axial direction. In this way, the impact load from the side of the seat inputted to the rod 35 intensively acts on the first cut-out 35A1 and the second cut-out 35A2 and thus can intensively act as a bending stress for flexing the rod 35 from these cut-outs in a Z shape in the direction away from the service plug 41 (the battery unit 40).

Accordingly, even if the impact load due to the side collision of the vehicle is inputted to the side frame 11A of the seat cushion 10 at the outer side of the vehicle in a direction which is not along the width direction of the seat, always, it can be induced that the rod 35 is stably subjected to the flexion deformity in a Z-shaped form. Further, the weakened parts 35A including the first cut-out 35A1 and the second cut-out 35A2 are formed on both ends of the rod 35, and thus, the both ends of the rod 35 are subjected to the flexion deformity in a Z-shaped form, so that the rod 35 can be entirely deformed to move largely in the direction away from the service plug 41 (the battery unit 40).

Hereinabove, although the illustrative embodiment of the present invention has been described with reference to one example, the present invention may be implemented in various embodiments other than the above example. For example, the first weakened portion or the second weakened portion of the weakened parts which are formed to the rod may be a concave portion, instead of the cut-out. Further, it is sufficient that the weakened parts are formed on the end portions of the rod to which the impact load from the side of the seat is inputted, and thus, may not be formed on the end portions of the other end side. Further, it is sufficient that the weakened parts are provided on or near the end portions of the rod to which the impact load is inputted, and thus, whether the installation locations are provided near the end of the rod or near the central portion of the rod is not particularly limited. Further, when the battery unit is provided at a location in front or rear of the rod, the first weakened portion and the second weakened portion of the weakened parts on the may be properly provided to the surface of the rod so that the rod can be subjected to the flexion deformity in a direction away from a battery unit installation location. Further, the rod is not limited to the connecting rod for synchronizing the lock releasing operation of each slide device but may be any rod, as long as the rod is installed between the both side frames of the seat cushion.

The present invention provides illustrative, non-limiting aspects as follows:

(1) In a first aspect, there is provided a vehicle seat including a rod installed between left and right side frames of a seat cushion, wherein the rod is provided with a weakened part which is configured to promote the buckling distortion of the rod in a predetermined direction so that the rod is subjected to flexion deformity in a first direction which is a direction away from a battery unit installed to a lower part of the seat cushion when a side collision occurs and thus an impact load is inputted to the seat cushion from a side of the vehicle seat, wherein the weakened part includes a first weakened portion and a second weakened portion which respectively weakens a portion of a surface of the rod facing the first direction and a portion of a surface of the rod facing a second direction opposite to the first direction at an end portion of a side of the rod to which the impact load is inputted, so that the rod is configured to be bent in the first direction and the second direction, and wherein the first weakened portion is formed closer to the side to which the impact load is inputted than the second weakened portion.

According to the first aspect, when the impact load is inputted to the rod from a side of the seat, the rod is subjected to the flexion deformity in such a way that a buckling distortion occurs in a first direction which is a direction away from the battery unit from the first weakened portion close to the inputted side and also a buckling distortion occurs in a second direction opposite to the first direction from the second weakened portion closer to the central side than the first weakened portion. Thereby, the rod is deformed to be pushed and shrunk in a width direction of the seat in such a way that the shape of the rod is entirely flexed in the direction away from the battery unit. In this way, it is possible to allow the rod to be properly subjected to the flexion deformity in the aimed direction away from the battery unit.

(2) In a second aspect, there is provided the vehicle seat according to the first aspect, wherein the first weakened portion and the second weakened portion are respectively formed as a cut-out which is formed by cutting out a portion of the rod.

According to the second aspect, the first weakened portion and the second weakened portion can be formed simply by forming the cut-outs on a portion of the rod.

(3) In a third aspect, there is provided the vehicle seat according to the first or second aspect, wherein the weakened part is symmetrically formed on both ends of the rod.

According to the third aspect, when the impact load is inputted to the rod from a side of the seat, both ends of the rod are respectively deformed to be pushed and shrunk in the width direction of the seat in such a way that the shape of the rod is flexed in the direction away from the battery unit. In this way, it is possible to allow the rod to be properly subjected to the flexion deformity in the aimed direction away from the battery unit.

(4) In a fourth aspect, there is provided the vehicle seat according to any one of the first to third aspects, wherein the rod is connected to each release member configured to release a slide lock state of a slide device provided below the left and right side frames of the seat cushion and synchronizes the slide lock releasing operation by each release member.

According to the fourth aspect, the rod that synchronously releases the slide lock state of each slide device at the left and right sides at normal times can be subjected to the flexion deformity so as not to interfere with the battery unit which is located below the seat cushion when the side collision of the vehicle occurs.

(5) In a fifth aspect, there is provided a vehicle seat comprising: left and right side frames of a seat cushion; and a rod installed between the left and right side frames, the rod including a weakened part which is configured to promote the buckling distortion of the rod in a predetermined direction so that the rod is subjected to flexion deformity in a first direction when an impact load is inputted to the seat cushion from a side of the vehicle seat, the weakened part including a first weakened portion and a second weakened portion which respectively weakens a portion of a surface of the rod facing the first direction and a portion of a surface of the rod facing a second direction opposite to the first direction at an end portion of a side of the rod to which the impact load is inputted so that the rod is configured to be bent in the first direction and the second direction, the first weakened portion being formed closer to the side to which the impact load is inputted than the second weakened portion.

What is claimed is:
1. A vehicle seat including a rod provided between left and right side frames of a seat cushion,
wherein the rod is provided with a weakened part which is configured to promote a buckling distortion of the rod in a predetermined direction so that the rod is subjected to flexion deformity in a first direction which is a direction away from a battery unit provided at a lower part of the seat cushion when a side collision occurs in which an impact load is inputted to the seat cushion from a side of the vehicle seat, wherein the weakened part includes a first weakened portion and a second weakened portion which respectively weakens a portion of a surface of the rod facing the first direction and a portion of a surface of the rod facing a second direction opposite to the first direction at an end portion of a side of the rod to which the impact load is inputted, so that the rod is configured to be bent in the first direction and the second direction, and wherein the first weakened portion is provided closer to the side to which the impact load is inputted than the second weakened portion.

2. The vehicle seat according to claim 1,
wherein the first weakened portion and the second weakened portion are cut-out portions of the rod.

3. The vehicle seat according to claim 1,
wherein the weakened part is symmetrically provided on both ends of the rod.

4. The vehicle seat according to claim 1,
wherein the rod is connected to release members, which are configured to release a slide lock state of a slide device provided below the left and right side frames of the seat cushion, and synchronizes the slide lock releasing operation of each release member.

5. A vehicle seat comprising:
left and right side frames of a seat cushion; and
a rod provided between the left and right side frames, the rod including:
   a weakened part which is configured to promote a buckling distortion of the rod in a predetermined direction so that the rod is subjected to flexion deformity in a first direction when an impact load is inputted to the seat cushion from a side of the vehicle seat, the weakened part including:
      a first weakened portion and a second weakened portion which respectively weakens a portion of a surface of the rod facing the first direction and a portion of a surface of the rod facing a second direction opposite to the first direction at an end portion of a side of the rod to which the impact load is inputted so that the rod is configured to be bent in the first direction and the second direction, the first weakened portion being provided closer to the side to which the impact load is inputted than the second weakened portion.

* * * * *